G. Kammerl,
Saw Teeth,
No. 40,757. Patented Dec. 1, 1863.
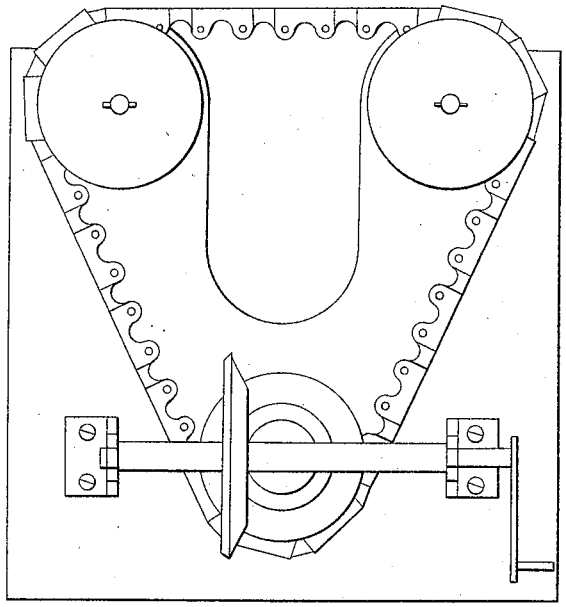
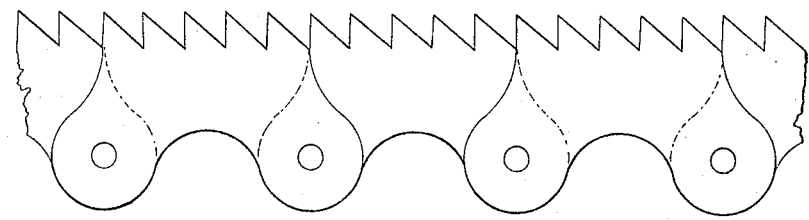
Witnesses:
John E. Shlasbauer.
Otto Spangenberg.
Inventor:
G. Kammerl.

UNITED STATES PATENT OFFICE.

GEORGE KAMMERL, OF NEW YORK, N. Y.

IMPROVEMENT IN ENDLESS SAWS.

Specification forming part of Letters Patent No. 40,757, dated December 1, 1863.

*To all whom it may concern:*

Be it known that I, GEORGE KAMMERL, of the city, county, and State of New York, have invented a new and Improved Mode of Constructing Saw-Blades for Cutting Wood and other Materials; and I do hereby declare that the following is a full and exact description thereof, reference being had to the accompanying drawing.

It is known that the saw-blades which we see in daily use in the different technical occupations are either of a circular or longitudinal shape, moving respectively in a routinuous, circular, or alternately to-and-fro direction, either by hand or machinery, as the case may be.

The nature of my invention consists in a saw-blade that is formed of a number of tempered steel plates or links firmly held together by rivets to form an endless chain, the outside edge of which carries the required teeth adapted to cutting wood or other materials, this whole chain or chain-saw blade moving continuously in one single direction over a system of grooved pulleys, one or more of which receive the required motive power. The rivets which hold the plates or links of this sawing-chain together do not project over the side surface of this chain and allow the same freely to move over the pulleys, of which one may be provided with a sliding motion, regulated by screws, so as to give the chain blade the required tension. The cut of this chain-blade is peculiar, so far as a constant change of one and two cutting-links takes place. The amount of wood actually cut away, or the size and thickness of the cut, may be somewhat greater than in the ordinary known saws—although it rarely need to be more than three-eighths of an inch—and both these peculiarities may be considered by some as inconvenient, yet the remaining advantages of my new chain-blade amply repay for them. The continuity of the stream of cutting-teeth, flowing, so to say, over the wood and removing in one direction, cleanly and cheap, all the sawdust, is an advantage it has in common with the circular saw, over the straight to-and-for one, and the straight line in which it works and the greater lengths of stroke, an unlimited one—in fact, it has partially over both, thus presenting new and peculiar features, which are of more or less advantage and weight, according to the use it is put to. The detached links of this chain may be made alike all over the States. If then anywhere one should break, the next hardware-store may furnish one to fit exactly in its place, and any one slightly experienced in the use of the hammer can rivet it in, and thus repair the saw. In regard to occasional filing and setting, it does not present any other requirements than the common saw now in use, and the pulleys to carry and drive the blade can and must be made quite simple and cheap, so as to correspond to the most primitive facilities.

In which manner or direction such a chain-blade with its system of pulleys is to be moved against the work, or vice versa, horizontally, vertically, or otherwise, in connection with what other machinery this sawing-chain may be used, the width and thickness of the links, length between centers, arrangement of pulleys, &c., all this is entirely depending on the use and material the saw is required for, and cannot be regarded as constituting any claims of mine; but

What I claim as my invention, and desire to secure by Letters Letters, is—

The peculiar chain-saw blade formed of a number of toothed steel links, rolling as an endless chain continually in but one direction over the required pulleys, in the manner which this specification and drawing clearly show.

G. KAMMERL.

Witnesses:
JOHN C. SHLARBAMA,
OTTO SPANGENBERG.